United States Patent
Becu

(10) Patent No.: US 12,208,829 B2
(45) Date of Patent: Jan. 28, 2025

(54) METHOD OF CONTROLLING AN INSTALLATION FOR TRANSPORTING VEHICLES USING A CONTINUOUSLY MOVING CABLE AND DEVICE CONFIGURED TO IMPLEMENT THE METHOD

(71) Applicant: Bureau des Etudes de Câbles, Fontenay-aux-Roses (FR)

(72) Inventor: Hugo Becu, Fontenay-aux-Roses (FR)

(73) Assignee: Bureau de Etudes de Câbles, Fontenay-aux-Roses (FR)

( * ) Notice: Subject to any disclaimer, the term of this patent is extended or adjusted under 35 U.S.C. 154(b) by 961 days.

(21) Appl. No.: 17/199,155

(22) Filed: Mar. 11, 2021

(65) Prior Publication Data

US 2021/0284212 A1    Sep. 16, 2021

(30) Foreign Application Priority Data

Mar. 11, 2020    (FR) ...................... 2002409

(51) Int. Cl.
| | |
|---|---|
| *B61L 27/04* | (2006.01) |
| *B61B 12/00* | (2006.01) |
| *B61B 12/04* | (2006.01) |
| *B61B 12/10* | (2006.01) |

(52) U.S. Cl.
CPC ............ *B61L 27/04* (2013.01); *B61B 12/007* (2013.01); *B61B 12/04* (2013.01); *B61B 12/10* (2013.01)

(58) Field of Classification Search
CPC ....... B61L 27/04; B61B 12/007; B61B 12/04; B61B 12/10; B61B 12/06; G01H 1/00; G01H 1/003
See application file for complete search history.

(56) References Cited

U.S. PATENT DOCUMENTS

| | | | |
|---|---|---|---|
| 5,778,797 A | 7/1998 | Mutaguchi | |
| 2007/0250244 A1* | 10/2007 | Revenant | B61B 12/022 701/3 |

FOREIGN PATENT DOCUMENTS

| | | | |
|---|---|---|---|
| CN | 104097644 | | 10/2014 |
| DE | 102017217830 A1 | * | 4/2019 |
| EP | 0618380 | | 10/1994 |
| FR | 2552725 A1 | * | 4/1985 |

(Continued)

OTHER PUBLICATIONS

FR 878209, Nov. 13, 2020, French Search Report.

*Primary Examiner* — Jacob S. Scott
*Assistant Examiner* — Erin Morris
(74) *Attorney, Agent, or Firm* — RAY QUINNEY & NEBEKER P.C.; Paul N. Taylor

(57) ABSTRACT

Method (200) for controlling an installation for transporting vehicles by at least one continuously moving cable, the method comprising a step of determining at least one oscillation (201) of at least one cable and/or one of the vehicles as a function of at least one parameter chosen from an average tension of the cable, an average speed of the cable, a distance between two successive vehicles, and an average mass carried by the vehicles, a step of generating a database (202) which connects a value of the oscillation to a combination of the average tension of the cable, the average speed of the cable, the distance between two successive vehicles, and the average mass carried by the vehicles, and a step of reducing the oscillation (203) by varying any of the parameters.

21 Claims, 4 Drawing Sheets

(56) References Cited

FOREIGN PATENT DOCUMENTS

PL 170020 B1 * 10/1996
SU 1270045 A1 * 11/1986

* cited by examiner

METHOD OF CONTROLLING AN INSTALLATION FOR TRANSPORTING VEHICLES USING A CONTINUOUSLY MOVING CABLE AND DEVICE CONFIGURED TO IMPLEMENT THE METHOD

The present invention relates to the field of transport installations such as aerial lifts. The invention relates more particularly to transport installations with continuous and reciprocating movement, for example provided with at least one mobile cable, in particular overhead, connected to one or more vehicles.

Different types of aerial lifts or cable transport installation exist. Some of these transport installations use a traction cable located at ground level, such as funiculars. Other installations use one or more overhead traction cables, such as cableways, gondolas, funitels and DMCs, chairlifts, or even aerial lifts with seats and gondolas. These transport installations allow the movement of one or more vehicles. These vehicles make it possible to transport passengers and/or equipment between several locations. These vehicles are also called gondolas, skips or seats.

For a cable transport installation, the dynamic behavior in steady state depends mainly on the following parameters: the mass moved along the cable(s), the distance between two successive vehicles present along the cable(s), the running speed of the mobile cable(s), and the value of the mechanical tension imposed on the cable(s).

In precise configurations of these parameters, the dynamic behavior of the installation can take the form of a low-frequency oscillatory phenomenon also called pumping phenomenon. The pumping phenomenon results in an elastic movement of the cable which may be accompanied by a pendular movement of the vehicles. The pendular movement of the vehicles can be longitudinal in the direction of transport and/or transverse with respect to the direction of transport, for example in windy conditions. An elastic movement of the cable along an axis parallel to the direction of the earth's gravity field is most often observed, but it can also be along an axis transverse to the direction of transport. These oscillatory phenomena are dangerous because the vehicles can collide with service buildings, with supports of the system, and/or can be uncomfortable, even dangerous, for travelers, for example causing motion sickness among the latter.

Dynamic behaviors are difficult to anticipate and predict, given their origins and the complexity of the transport system. The movement of the cables and/or the vehicles is dictated by parameters whose evolution is random, such as temperature, wind, influx of passengers or mechanical wear, and by deterministic parameters, for example parameters related to mechanical stresses. Describing the dynamic behavior of the transport system thus requires access to parameter values which are measured directly on the transport system during its operation. However, the current control devices for cable transport systems do not take into account the continuous development of the cable transport installation based on the operating conditions. In addition, these control devices are not designed to act as "active dampers" against the oscillations encountered on cable transport installations.

The object of the present invention is to alleviate at least one of the aforementioned drawbacks and also to lead to other advantages by proposing a new type of method for controlling a vehicle transport installation by a continuously moving cable.

Another object of the invention is to improve passenger comfort and safety during their transport by the installation for transporting vehicles by a continuously moving cable.

According to one embodiment, the invention provides a method for controlling an installation for transporting vehicles by at least one continuously moving cable, the method comprising a step of determining at least one oscillation of the cable and/or of at least one of the vehicles as a function of at least one parameter chosen from an average tension of the cable, an average speed of the cable, a distance between two successive vehicles, and an average mass carried by the vehicles, a step of generating a database which connects a value of the oscillation to a combination of the average tension of the cable, the average speed of the cable, the distance between two successive vehicles, and the average mass carried by the vehicles, and a step of reducing the oscillation by varying any of the parameters according to the database.

The invention thus makes it possible to eliminate or even anticipate uncomfortable or even dangerous oscillatory behavior of at least one cable and/or at least one of the vehicles carried by the cable by measuring an oscillation of the cable and/or at least one of the vehicles and a database linking an oscillation of the cable and/or at least one of the vehicles to the parameters of the installation.

According to one embodiment, the value of the oscillation is an amplitude of the oscillation. In other words, an amplitude of the oscillation corresponds to the amplitude of the vibratory phenomena which affect the transport installation.

According to one embodiment, the oscillation is an established periodic oscillatory movement.

According to one embodiment, the step of generating the database is part of a learning cycle. The learning cycle is generally initiated before the commercial commissioning of the transport installation and/or during the commercial operation of the transport installation.

According to one embodiment, the vehicles are uniformly distributed over the cable.

According to one embodiment, the step of generating the database comprises a first oscillation sampling sub-step, each oscillation being associated with the measurement of the average tension of the cable, the average speed of the cable, the distance between two successive vehicles, and the average mass carried by the vehicles. This first sub-step can be carried out before the commercial operation of the installation for transporting vehicles by a continuously moving cable.

According to one embodiment, the step of generating the database comprises a second sub-step of extrapolating the data obtained during the first sampling sub-step to complete the database.

According to one embodiment, the first sampling sub-step comprises enriching the database with at least one oscillation, the oscillation being associated with the measurement of the average tension of the cable, the average speed of the cable, the distance between two successive vehicles, and the average mass carried by the vehicles, obtained during the operation of the installation for transporting vehicles by a continuously moving cable.

According to one embodiment, the step of generating the database is carried out by measuring and calculating the parameters when the installation for transporting vehicles by a continuously moving cable operates in steady state.

Here, as well as in what follows, "steady state" means that the parameters of the installation for transporting vehicles by a continuously moving cable are substantially constant over time when the installation for transporting vehicles by a continuously moving cable is in operation.

Here and in what follows, "substantially" means that the parameters vary by +/−10% over time with respect to an average value.

According to one embodiment, the control method comprises a step of comparing the oscillation value and a threshold value above which oscillation is prohibited and below which oscillation is authorized.

According to one embodiment, the step of reducing the oscillation comprises a sub-step for optimizing the parameter to be varied so that the value of the oscillation is minimal.

According to one embodiment, the optimization sub-step is carried out directly after the comparison step when the oscillation value is less than the threshold value.

According to one embodiment, the step of reducing the oscillation comprises a sub-step for improving the parameter to be varied by choosing a value of said parameter from the database when the oscillation value is greater than the value threshold in order to bring the oscillation value to a value less than the threshold value, the improvement sub-step being performed before the optimization sub-step.

According to one embodiment, the step of reducing the oscillation comprises a sub-step of adjusting the parameter to be varied in order to bring the value of said parameter to the optimized value.

According to one embodiment, the step of reducing the oscillation comprises a sub-step of checking the possibility of reaching the optimized value of the parameter to be varied, in the negative, another parameter is adjusted.

According to one embodiment, the step of reducing the oscillation comprises a sub-step of checking the possibility of reaching the optimized value of the parameter to be varied, in the affirmative the value of said parameter is adjusted to the optimized value.

According to one embodiment, the verification sub-step is carried out by following the adjustment sub-step.

According to one embodiment, the method comprises a step of recording the optimized value of the parameter to be varied as a function of a setpoint value of the parameter to be varied in order to generate a data library.

According to one embodiment, the oscillation is reduced by acting on the average speed of the cable and/or the average tension of the cable.

According to one embodiment, the optimization sub-step comprises a phase of varying the value of the parameter to be varied, a phase of reading a value of the oscillation before and after the phase of varying the parameter to varied, a phase of comparing the value of the oscillation before and after the phase of varying the parameter to be varied, and a phase of confirming the reduction of the oscillation, in the affirmative, the method returns to the variation phase.

According to one embodiment, the optimization sub-step comprises a phase of varying the value of the parameter to be varied, a phase of reading a value of the oscillation before and after the phase of varying the parameter to be varied, a phase of comparing the value of the oscillation before and after the phase of varying the parameter to be varied, and a phase of confirming the reduction of the oscillation, in the negative, the improved parameter is optimized. Thus, the value of the parameter to be varied has reached the optimized value of said parameter.

An acceptable oscillation is an oscillation below the threshold value.

According to one embodiment, the value of one of the parameters is a setpoint imposed by an operator of the installation for transporting vehicles by a continuously moving cable.

According to one embodiment, the parameter on which a setpoint is imposed is the average cable speed. Thus, the other parameters not recorded are the average tension of the cable, the distance between two successive vehicles, and the average mass carried by the vehicles.

According to one embodiment, the control method comprises a step of recording the optimized value of the parameter to be varied as a function of a setpoint value of the parameter to be varied in order to generate a data library.

According to one embodiment, the invention also provides a learning and correction device for an installation for transporting vehicles by a continuously moving cable comprising at least one computing system configured to implement the control method according to invention.

According to one embodiment, the computing system comprises at least one processor. It is therefore understood that the computing system can be a central processing unit or a remote computer server. The learning and correction device can access the remote computer server by a wired or wireless connection to the Internet communication network.

According to one embodiment, the invention further provides an installation for transporting vehicles by a continuously moving cable comprising at least one learning and correction device according to the invention.

According to one embodiment, the installation for transporting vehicles by a continuously moving cable comprises a control device configured to act on at least one parameter of the installation for transporting vehicles by a continuously moving cable as a function of at least one instruction sent by the learning and correction device and/or by an operator, the parameters being chosen from an average tension of the cable, an average speed of the cable, a distance between two successive vehicles, and an average mass carried by the vehicles.

According to one embodiment, the control device comprises a user interface coupled to a processor and configured to allow an operator to choose a setpoint of at least one parameter chosen from an average tension of the cable, an average speed of the cable, and a distance between two successive vehicles.

According to one embodiment, the invention also provides a computer program comprising portions of program codes for the execution of at least one of the steps of the method for controlling an installation for transporting vehicles by continuously moving cable according to the invention, when said program is executed on a computer.

According to one embodiment, the invention finally provides a computer program product comprising a set of instructions which, once loaded on a computer, allow the implementation of the method for controlling an installation for transporting vehicles by a continuously moving cable according to the invention.

Other features and advantages of the invention will become apparent from the following description on the one hand, and from several embodiments given by way of indication and non-limitingly with reference to the appended schematic drawings on the other hand, in which.

It should first of all be noted that while the figures set out the invention in detail for its implementation, they can of course be used to better define the invention if necessary. It should also be noted that, in all the figures, elements that are similar and/or fulfill the same function are indicated by the same numbering.

Figure 1:
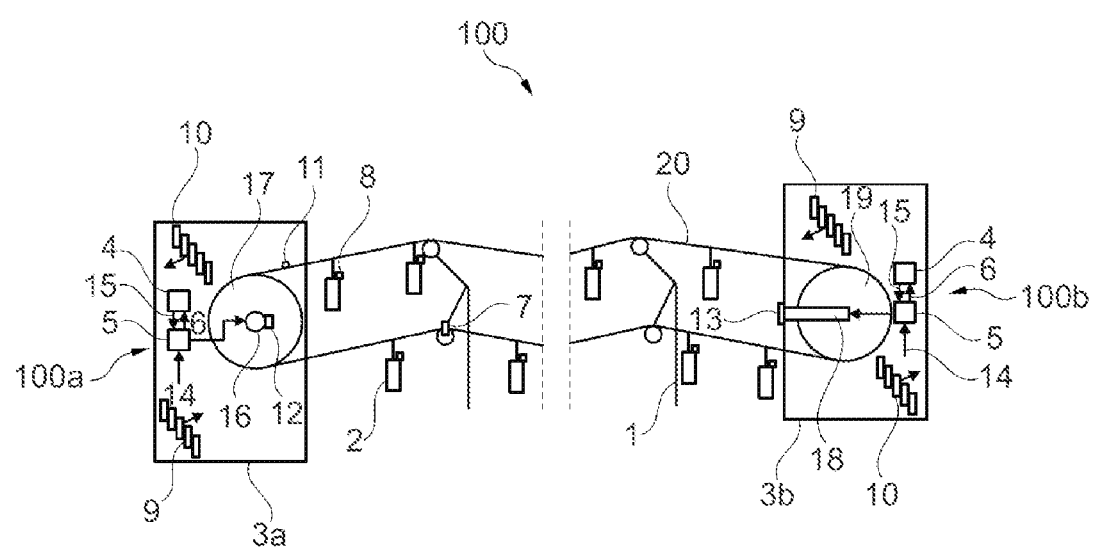
FIG. 1 is a schematic illustration of a transport installation using one or more guided cables, mobile or fixed, and using the control method of the invention.
Figure 2:
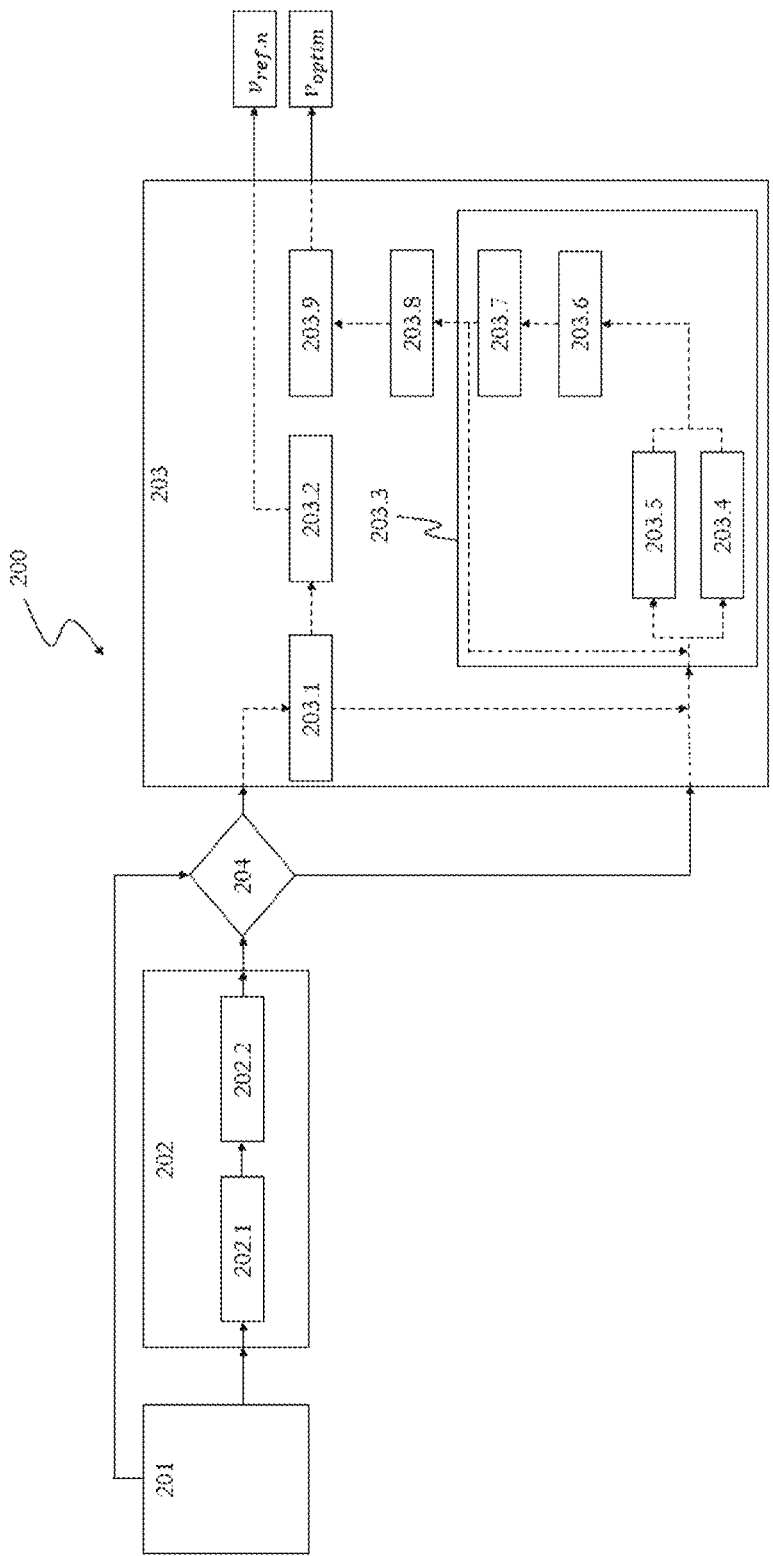
FIG. 2 is a flowchart showing the different steps of the control method according to the invention.

FIG. 1 shows a transport installation 100 using the control method 200 according to the invention. The transport installation 100 comprises a continuously moving mobile cable 20, guided and supported by a plurality of pylons 1. In an embodiment which is not shown, the transport installation 100 comprises a plurality of cables 20.

The cable 20 is a traction and carrying cable, that is to say, the cable 20 provides both a traction and support function for the vehicles 2 attached to the cable 20. The cable 20 is continuous in a closed loop. The cable 20 is a metal cable comprising a plurality of metal wire strands which are twisted into a helix forming a composite "rope," in a pattern called a "laid rope," or comprises a plurality of metal cables having a laid rope pattern arranged according to a pattern called "laid cable." The cable is mainly made of steel.

The transport installation 100 also comprises vehicles 2. The vehicles 2 can be used to transport people and/or equipment. The vehicles 2 are configured to be coupled to the cable 20 and towed by the latter. More particularly, the transport installation 100 can be a cableway, and in this case the vehicles 2 are closed, or a chairlift where the vehicles 2 are open. In an embodiment which is not shown, the transport installation 100 may comprise other traction and/or carrying cables, in particular when the vehicles 2 are large and heavy. These other cables can be traction or carrying cables The transport installation 100 also comprises two end stations 3a, 3b for the embarkation and/or disembarkation of people and/or equipment in vehicles 2. A first station 3a is located at a first end 100a of the transport installation 100 and a second station 3b is located at a second end 100b of the transport installation. The stations 3a, 3b are also called terminals. Thus, as illustrated in FIG. 1, the cable 20 makes it possible to move the vehicles 2 by traction from the first station 3a to the second station 3b, and vice versa.

In an embodiment which is not shown, the transport installation can comprise at least one intermediate station located along the cable. It is also intended for the embarkation and/or disembarkation of passengers and/or the transshipment of equipment depending on the type of use of the transport installation 100.

The cable 2 is driven by a driving pulley 17, which in turn is driven via a shaft connected to an electric motor 16 of the first end station 3a, also called the driving station. The second end station 3b in turn comprises a non-motorized return pulley 19 and a tensioning system 18 for the cable 20. The return pulley 19 is therefore not driven by the electric motor 16 or another motor. The return pulley 19 is free to rotate. The return pulley is also called an idler pulley.

In another embodiment which is not shown, the tensioning system 18 is located in the driving station 3a. The tensioning system 18 comprises a mobile carriage for tensioning the cable 20, the carriage supporting the driving pulley 17. The driving pulley 17 then plays a tensioning and driving role.

As shown in FIG. 1, the transport installation 100 furthermore comprises a learning and correction device 4 which acts in direct interaction with a control device 5 of the transport installation 100. The learning and correction device 4 comprises at least one computing system, not shown, which is configured to implement the method which is described later in the disclosure. The computing system can be a central processing unit comprising at least one single-core or multi-core processor. In another embodiment, the computing system is a remote computer server to which the learning and correction device 4 has access by a wired connection or by a wireless connection via a communication network, such as the Internet. The connection to the communication network can be secured.

The control device 5 is configured to act on at least one parameter of the transport installation 100 as a function of at least one instruction 15 sent by the learning and correction device 4. The control device 5 furthermore comprises a user interface coupled to a processor to allow an operator 14 to give setpoint values to at least one of the parameters of the transport installation 100.

In the example described and shown in FIG. 1, the parameters of the transport installation 100 are an average tension T of the cable 20, an average speed v of the cable 20, a distance d between two successive vehicles 2, and an average mass m carried by the vehicles 2.

The learning and correction device 4 is configured to receive information 6 on the parameters of the transport installation 100, this information 6 being at least in part collected by a set of sensors located in the transport installation 100. The set of sensors comprises measurement sensors 7 arranged on the pylons 1, measurement sensors 8 placed on the vehicles 2, counting sensors 9 configured to count the passengers and/or the quantity of equipment entering the transport installation 100 and arranged in stations 3a, 3b, counting sensors 10 configured to count the passengers and/or the quantity of equipment leaving the transport installation and arranged in the stations 3a, 3b, a measuring sensor 11 to carry out measurements on the cable 20, a measuring sensor 12 to carry out measurements on the electric motor 16, a measuring sensor 13 to carry out measurements on the tensioning system 18 of the cable 20.

The learning and correction device 4 can also receive information 6 given by the operator 14 via the user interface of the control device 5. Thus, the operator 14 can set a setpoint for at least one of the parameters of the transport installation 100.

The collected information 6 is then processed by a computer program product comprising portions of program codes which, once loaded on the computing system, allow the implementation of the control method 200 of the transport installation 100. After processing, the learning and correction device 4 sends a set of instructions 15 to act on at least one of the parameters of the transport installation 100 even if a setpoint has been given to at least one of the parameters. By acting for example on the electric motor 16, the driving pulley 17 and/or the tensioning equipment 18, the learning and correction device 4 will make it possible to control the dynamic behavior of the transport installation 100 such as low-frequency vibratory phenomena, also called pumping phenomena, in particular taking the form of at least one oscillation of the cable 20 and/or of at least one of the vehicles 2. In the remainder of the disclosure, the oscillation is considered to be an established periodic oscillatory movement.

The motor 16 is controlled and speed-regulated on the transport installation 100. The motor 16 acts on the driving pulley 17. As the low-frequency vibratory phenomena take the form of at least one oscillation of the cable 20 and/or at least one of the vehicles 2, the forces generated on the cable 20 have a direct effect on the instantaneous change of the torque on the shaft linked to the driving pulley 17 and therefore, consequently, on the value of the instantaneous torque delivered by the motor 16. Knowing the value of torque variations AC at the driving pulley 17 therefore provides direct information on the value of the amplitude of the vibratory phenomena which affect the transport installation 100, for example the value of the amplitude of at least one oscillation of the cable 20 and/or at least one of the vehicles 2 of the transport installation 100.

In order to improve the precision of the measurement of the amplitude of the vibratory phenomena, the measurement of the torque variations AC can be supplemented by measurements done by sensors placed directly in the cable spans 20 and along the cable line 20. Thus, feeler rollers can be placed on the pylon supports 1. The feeler rollers are fitted with force sensors which deliver a signal whose variation is an image of the amplitude of the oscillations of the cable 20 and/or of at least one of the vehicles 2. In addition or alternatively, accelerometers are available in at least one of the vehicles 2, preferably in several vehicles 2. Complementarily or alternatively, it is possible to measure the instantaneous speed of rotation at the return pulley 19, the dynamic change of which takes place according to the tensions of the cable 20. A measurement done at the return pulley gives a characterization of the overall dynamics of the transport installation 100.

These additional measures to improve the measurement precision of the amplitude of the vibratory phenomena make it possible to take into account part of the vibratory phenomena which do not return to the driving pulley 17 and therefore which do not significantly affect the change of the instantaneous torque of the motor 16. Indeed, several reasons explain why some of the vibratory phenomena which are present on the line may not perceptibly affect the torque at the driving pulley 17. For example, a span of cable 20 subjected to an oscillation and which is too far from the driving pulley 17 causes the variations in cable tension induced by the oscillation to be "smoothed" by the dissipative effects present along the cable 20 at the supports of the pylons 1, that is to say, the friction between the cable 20 and the linings of the rollers at the supports of the pylons 1.

The synthesis of the measurements carried out at these different points characterizes the vibratory phenomena affecting the transport installation, and in particular characterizes an overall amplitude of the oscillations of the cable 20 and/or of at least one of the vehicles 2 of the transport installation 100.

In the remainder of the description, only the torque variations AC are considered to reflect the value of the amplitude of at least one oscillation of the cable 20 and/or of at least one of the vehicles 2 of the transport installation 100.

Figure 3:
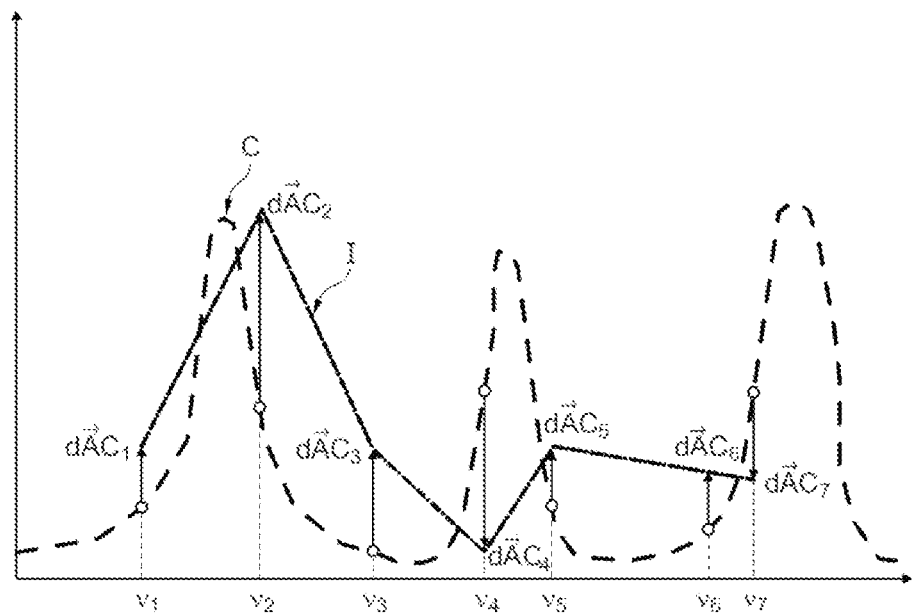
FIG. 3 is a graph showing the change curves of the oscillation value as a function of the speed v of at least one cable of the transport installation.

The control method 200 of the vehicle transport installation 100 making it possible in particular to control the vibratory phenomena of the transport installation 100, such as at least one oscillation of the cable 20 and/or of at least one of the vehicles 2, will now be described. A flowchart of the control method 200 is illustrated in FIG. 3.

In the following, the learning and correction device 4 acts directly on the speed setpoint of the cable 20 which is transmitted to a drive control variator of the cable 20 via the control device 5. The drive control variator is a module located just before the motor which controls the energy flows sent to it. In addition, it is a control component of the motor 16.

The control method 200 comprises a step of determining 201 at least one oscillation of the cable 20 and/or of at least one of the vehicles 2 as a function of at least one parameter chosen from an average tension T of the cable 20, an average speed v of the cable 20, a distance d between two successive vehicles 2, and an average mass m carried by the vehicles 2, a step of generating a database 202 which relates a value of the amplitude of the oscillation to a combination of the average tension T of the cable 20, the average speed v of the cable 20, the distance d between two successive vehicles 2, and the average mass m carried by the vehicles 2 and a step of reducing the oscillation 203 by varying at least any one of the parameters.

The value of the torque variations AC is considered to correctly reflect the value of the amplitude of at least one oscillation of the cable 20 and/or of at least one of the vehicles 2.

The step of generating the database can be part of a learning cycle. The learning cycle is generally initiated before the commercial commissioning of the transport installation and/or during the commercial operation of the transport installation.

The step of generating the database 202 comprises a first oscillation sampling sub-step 202.1. During this step, each oscillation of the cable 20 and/or of at least one of the vehicles 2, via the value of the torque variations AC, is associated with the measurement of the average tension T of the cable 20, the average speed v of the cable 20, the distance d between two successive vehicles 2, and the average mass m carried by the vehicles 2.

The learning and correction device 4 carries out measurement cycles, each of a duration DT and in steady state, that is to say, outside the transient phases of acceleration or braking of the cable 20. Recorded in each cycle of duration DT are the value of the average mass m carried by the vehicles 2 or present on the cable 20, the average tension value T imposed on the cable 20, the value of the average speed v and the distance d between two successive vehicles 2 on the cable.

In other words, the learning and correction device 4 carries out measurement cycles of the parameters of the transport installation 100 over a duration DT when the transport installation 100 has reached a steady operating state. In steady state condition, it is considered that the control device 5 sends a constant speed instruction to the cable drive device 20, while the actual speed of the mobile cable 20 changes around this constant speed instruction.

The value of the torque variations AC is evaluated at the driving pulley 17 during the cycles of duration DT by the measurement sensor 12 arranged on the electric motor 16. The value of these torque variations AC is read by following the changes in the value of the current absorbed by the electric motor 16.

The value of the instantaneous current absorbed by the electric motor 16 at the instant t, noted IC(t), then gives a direct image of the instantaneous engine torque CM(t) according to the relationship:

$$CM(t)=K*IC(t)$$

where K is a constant of proportionality depending on the type of electric motor 16 and the electromagnetic characteristics of the electric motor 16.

To access the value of the torque variations AC, a first calculation of the average of the current signal IC absorbed by the motor over a cycle duration DT, noted MC, is carried out by the learning and correction device 4. A calculation of the deviation ΔMC from the average MC of each current value IC absorbed by the electric motor 16 measured with a sampling period dT is then carried out:

$$\Delta MC(dT) = |IC(dT) - MC|.$$

During a cycle, a number DT/dT of sampled values IC(dT) is saved. By averaging the DT/dT deviations ΔMC thus obtained over a cycle, i.e., the average of the variations around the average, an approximate average value of the value of the torque variations AC is obtained:

$$AC = \frac{dT}{DT} \sum_{dT} \Delta MC(dT)$$

In another embodiment which is not shown, the value of the torque variations AC can be measured by performing a force measurement directly, for example, with a gear motor assembly mounted on a cradle free to rotate along the axis of the shaft connected to the driving pulley 17 and equipped with force sensors.

Instead of reading the value of the current absorbed from the motor 16, other means can be envisaged for quantifying at least one oscillation of the cable 20 and/or of at least one of the vehicles 2. For example, from a signal from an accelerometer placed in the vehicles 2, and/or owing to the measurement sensors 7 on the pylons 1 in direct contact with the cable 20 and reacting to its movements, and/or more broadly by using any sensor that gives information on the movements of the cable 20 and vehicles 2.

The value of the average tension T of the cable 20, imposed by the tensioning system 18, over the duration DT, is read from the signal from the measurement sensor 13. In the case of a tension by counterweight, the mass of the tensioning system is indicated and considered to be fixed. In the case of a fixed anchoring of the cable, the tension is read from a force sensor located in the anchoring or any other sensor assembly performing a similar function.

The value of the average speed v of the mobile cable 20 over the duration DT is evaluated from the measurement sensor 11 in contact with the cable in one of the two stations 3a, 3b. The measurement sensor 11 is for example a tachometric pulley. In another embodiment, the evaluation of the average speed v of the cable 20 can be made from the measurement sensor 7 placed on the pylon 1.

To calculate the distance d between two successive vehicles 2, it is necessary to quantify the number $n_{vec}$ of vehicles 2 traveling along the cable 20 as well as the total length L of the cable loop 20.

The number $n_{vec}$ of vehicles 2 traveling along the cable 20 is either known beforehand, since it is entered manually by the operator 14 into the control device 5, or evaluated over the duration of the cycle with duration DT by an individual count of each vehicle 2 identified when passing through a station 3a, 3b. In this second case, the counting is performed by a sensor which may be of the inductive type or which performs a similar function.

The total length L of the cable loop 20 is measured by an angular measuring device, or by a device performing a similar function in direct or indirect contact with the cable 20.

It is thus possible to calculate the distance d which separates two consecutive vehicles 2 considered to be uniformly distributed along the cable 20 according to the following formula:

$$d = \frac{L}{n_{vec}}$$

The average mass m carried by the vehicles 2 moving along the cable 20 over the duration DT of the cycle is estimated by the measurement sensors 9, 10 positioned in the stations 3a, 3b. In the case of use for the transport of passengers, the average mass m is calculated from the number of passages made at the entrances and possibly exits of the transport installation 100 for each side operated. According to one embodiment, the transport installation 100 is integrated into a network in an urban area which requires the presence of control gates at each crossing point; the counting is then carried out both at the entrance and at the exit. According to another embodiment, the transport installation 100 is located in ski areas; a single count of passengers can then be carried out. In this case, only the entry passages are used to estimate the average mass m.

It is possible to operate the transport installation 100 only in one direction or else in both directions of travel of the cable 20, which requires an estimate of the average mass m of only one side or of both sides of the cable loop 20.

To refine the knowledge of the average mass m carried by the cable 20, the passages at the entrances give an estimate of the mass of the first half of a side of the line or of its entirety if there is no counting at the exit, while the number of passages at the exit provides information on the mass of the second half. An estimator of the average mass m, internal to the learning and correction device 4, thus uses this information to return an average mass value m over the duration DT.

According to another embodiment, the monitoring of the change in the displacement of the tensioning system 18 of the cable 20 or of the engine torque 16 is a means of accessing an estimate of the value of the average mass m carried by the vehicles 2. According to another embodiment, it is also possible to use sensors directly inside the vehicles 2.

These measurements define a table of parameters TP grouping together the four measured and/or calculated values of the four parameters of the transport installation 100:

$$TP = [mTvd].$$

For each table of parameters read during the cycles of duration DT, the corresponding value of the torque variations AC is then associated. A database is thus constituted by all the torques (TP, AC) encountered during the operation of the transport installation 100.

The first sampling sub-step 202.1 can form part of the learning cycle generally initiated before the commercial commissioning of the transport installation 100 in order to rapidly generate the database. The database can continue to be fed over the course of the successive learning cycles carried out during the operation of the transport installation 100.

In order to enrich the database of torques (TP, AC) as quickly and efficiently as possible during the learning cycle, it may be necessary to define a learning cycle protocol recording the measurement of torque oscillations AC for average speeds v of the cable 20, average tension values T of the cable 20, numbers $n_{vec}$ of vehicles 2 attached to the cable 20, average mass m carried by the cable 20, these values being precisely defined by the protocol.

To vary the mass m carried by the cable 20, it is possible to use controlled mass weights positioned on the vehicles 2. It is also possible that the vehicles 2 are empty for the implementation of the learning cycle protocol.

This protocol therefore makes it possible to scan a wide range of torques (TP, AC) in order to obtain a rough map of the dynamic behavior of the transport installation 100.

If the operator 14 wishes to impose a setpoint on the value of one of the parameters, it may be useful to complete the rough map by measuring the value of the torque variations AC for several values of the parameter on which the operator 14 wishes to impose a setpoint, the value of the other parameters being fixed.

Thus, if the operator wishes to impose a setpoint on the value of the average speed v of the cable 20, it may be useful to complete the rough map by measuring the value of the torque variations AC for several different average speeds v, the average mass m, average tension T and distance d parameters being fixed. In other words, the average speed v varies while the other parameters are constant and known.

This results in curves C representing the torque variation AC depending on the average speed v, each curve C therefore being associated with a triplet of the fixed parameters [m T d] that are the average mass m, the average tension T and the distance d. In other words, the torque variation AC is a function g of the average speed v for a triplet of fixed parameters [m T d]:

$$AC = g_{[m,T,d]}(v)$$

The first sampling sub-step (202.1) can also comprise enriching the database during the operation of the transport installation 100 by recording an instantaneous torque (TP, AC) of the transport installation 100 carried out by the learning and correction device 4 over a duration DT. The instantaneous torque (TP, AC) is a priori different from the other torques already recorded in the database. In fact, the mass carried by the transport installation 100 changes continuously and varies according to the number of people. Likewise, the setpoint for the speed of the cable 20 varies according to the operating conditions; for example, the loading conditions of the vehicles 2 vary according to the crowds, the wind, or the presence of beginner skiers requiring the speed to be reduced in order to facilitate embarkation. There are therefore theoretically infinite possible tables of parameters TP.

During operation, if the instantaneous table of parameters TP encountered by the learning and correction device 4 is already present in the database, then the database is updated with the value of the instantaneous torque variation AC corresponding to the instantaneous table of parameters TP in order to take account of the change of the vibratory phenomena of the transport installation 100 according to the operating conditions such as, for example, wear, elongation of the cable or even temperature.

The transport installation 100 is considered to be operating and to have reached the steady state for a speed setpoint $v_{ref}$ given by the operator 14. All the sensors allow the learning and correction device 4 to know, in real time, the value of the parameters that are the average mass m carried by the vehicles 2, the average tension T of the cable 20, the distance d between two successive vehicles evenly distributed over the cable 20, i.e. the real triplet $[m\ T\ d]_{real}$ and the value of the torque variations $AC_{real}$. These measurements are therefore carried out in real time.

The step of generating the database 202 comprises a second sub-step of extrapolating 202.2 the data obtained during the first sub-step to complete the database 202.1, in particular when the triplet $[m\ T\ d]_{real}$ is not in the database and therefore there is no curve C. Interpolation thus provides access to knowledge of the value of the torque variations AC of the cable 20 according to the average speed v of the cable for any given triplet encountered during the operation of the transport installation 100 which was not part of the learning cycles of the first sub-step 202.1. In this way, it allows the learning and correction device 4 to correct the average speed v for any triplet of parameters of the transport installation 100 in order to avoid an inappropriate dynamic behavior of the transport installation 100, i.e., at least one inappropriate oscillation of the cable 20 and/or of at least one of the vehicles 2.

In order to perform the interpolation, it is assumed that the torque variation AC depending on the average cable speed v with respect to each parameter of a considered triplet is a linear function in the neighborhood of the considered triplet. It is thus possible to calculate the gradient of the torque variations AC with respect to each parameter of the considered triplet, that is to say, with respect to the average mass m, the average tension T and the distance d:

$$\vec{\nabla} AC = \begin{pmatrix} \dfrac{\partial AC}{\partial m}(v) \\ \dfrac{\partial AC}{\partial T}(v) \\ \dfrac{\partial AC}{\partial d}(v) \end{pmatrix}_{v\ fixed}$$

To perform this gradient calculation, we classify the curves C of torque variation AC by average speed families v. Each curve C being associated with a triplet of parameters [m T d], we then classify them into groups such that only one of the three parameters of the triplets [m T d] changes while the other two keep fixed values.

From these families and these groups thus created, the evaluation of the partial derivative $$\frac{\partial AC}{\partial .}(v)$$

of the torque variation AC is reached with respect to each parameter m, T and d of the triplets, and for each of the average speeds v present in the database.

Once the gradients are known, the interpolation is performed by looking in the database for the curve C of torque variations AC as a function of the average speed v whose triplet [m T d] corresponds notably to the triplet in real time $[m\ T\ d]_{real}$ of the transport installation 100. Here, as well as in what follows, "notably" means that the distance between the triplet [m T d] and the real triplet $[m\ T\ d]_{real}$ is minimal.

The preceding calculation of the gradient is then applied to the variations between each of the parameters of the two targeted triplets, which makes it possible to obtain the curve I of the variations in torque AC interpolated according to the average speed v for the triplet $[m\ T\ d]_{real}$.

Referring to FIG. 3, a curve C, obtained during learning and representing the torque variation AC as a function of the average speed v for the parameter triplet [m T d]. From this curve C known by learning, an interpolation is carried out in order to access the knowledge of the curve I according to the interpolation method which has just been described. The curve I therefore represents the variation in torque, and therefore the amplitude of the oscillation of the cable 20 and/or of at least one of the vehicles 2, as a function of the average speed v for a current triplet [m T d]$_{real}$, which is not the result of learning.

The control method 200 comprises a step of comparison 204 between the oscillation value, namely the value of the variation in cut AC$_{real}$ and a threshold value VS above which oscillation is prohibited and below which oscillation is authorized.

The plot of curves C and I representing the torque variation AC depending on the average speed v for a given triplet shows average speed threshold values above which the corresponding torque variation AC is unacceptable because it corresponds to an inadequate amplitude of the oscillation. In other words, the threshold values define a border in average speed v not to be crossed for each triplet of the database [m T d] and therefore the real triplet [m T d]$_{real}$.

Figure 4:
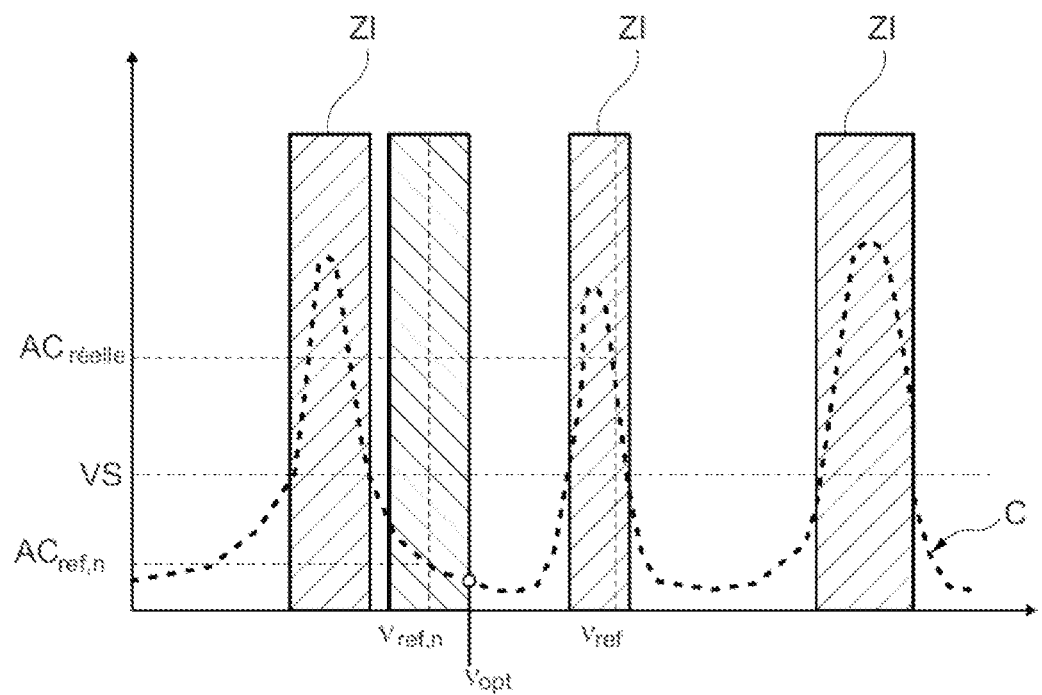
FIG. 4 is a graph showing a profile of areas of instability as a function of the average speed of the cable of the transport installation.

FIG. 4 shows a graph which shows the curve C of FIG. 3, that is to say, the torque variation AC as a function of the average speed v for a triplet [m T d]. The threshold values VS not to be exceeded define zones of instability ZI in which the threshold values not to be crossed are found.

The learning and correction device 4 chooses, from the database, the curve C whose triplet [m T d] matches the triplet [m T d]$_{real}$ or proceeds to the interpolation in order to obtain the curve I of the triplet [m T d]$_{real}$. The learning and correction device 4 then determines the threshold values. Before proceeding to the oscillation reduction step 203, the learning and correction device 4 can compare the value of the torque variation AC$_{real}$ to the threshold value VS.

If the value of the torque variation AC$_{real}$ is greater than or equal to the threshold value VS for the speed setpoint v$_{ref}$ and is therefore in the instability zone ZI for the speed setpoint v$_{ref}$, then the learning and correction device 4 proceeds to a sub-step 203.1 for improving the oscillation reduction step 203, that is to say, to a reduction of the value of the torque variation AC by varying at least one of the parameters by choosing a value of said parameter in the database. As can be seen in the example illustrated in FIG. 4, the value of the torque variation AC$_{real}$ for the triplet [m T d]$_{real}$ which corresponds to the triplet of [m T d] already registered in the database falls into a prohibited zone ZI.

For this step of reducing the oscillation 203, the learning and correction device 4 will change the value of at least one of the parameters, for example on the average speed v and therefore on the speed setpoint v$_{ref}$ chosen by the operator 14 and/or on the average tension T of the cable 20.

The sub-step 203.1 for improving the reduction step 203 of the oscillation, and therefore of the value of the torque variation AC, relates, in the example, to an average speed v in order to be placed below the threshold value VS by using the curves C or I, while guaranteeing an average speed v of the cable 20 as close as possible to the speed setpoint v$_{ref}$. In other words, the learning and correction device 4 will define a new speed setpoint v$_{ref,n}$ and therefore a range of variation of the average speed v of the cable 20 around v$_{ref,n}$ which is close to the speed setpoint v$_{ref}$ set by the operator 14, and while remaining outside the zone of instability ZI using the database. FIG. 4 shows that the new speed setpoint v$_{ref,n}$, to which the torque variation AC$_{ref,n}$ corresponds, is outside the zones of instability.

Step 203 of reducing the value of the torque variation AC may comprise a first sub-step 203.2 for verifying the possibility of reaching the new speed setpoint v$_{ref,n}$ close to the speed setpoint v$_{ref}$ in order to stay outside the zone of instability ZI and to achieve either an acceptable oscillation or the absence of oscillation. In the event that the new speed setpoint v$_{ref,n}$ is too restrictive, for example, because there is too much deviation from the speed setpoint v$_{ref}$, but is nevertheless necessary in order to deviate from an instability and to achieve the improvement under good conditions, the learning and correction device 4 makes the adjustment by making the correction on an alternative or complementary parameter of the speed, the alternative or complementary parameter being easily controllable, such as through the cable tension T for example. This change of parameter corrected by the learning and correction device 4 takes place until the correction can be resumed on the average speed, for example following a modification of the mass m on the line. The learning and correction device 4 then operates again as detailed previously, and reapplies a nominal tension to the cable 20 identical to that before modification.

The step of reducing the oscillation 203, that is to say, the value of the torque variation AC, may comprise a speed optimization sub-step 203.3. The goal is to very slightly modify the new speed setpoint v$_{ref,n}$ from the database in order to obtain an optimized speed setpoint v$_{optim}$ in terms of minimum torque variations AC, knowing that the instability zones have already been escaped, that is to say, one is located at a minimum point of the oscillations according to the data obtained during the improvement sub-step 203.1. Indeed, this is not the real minimum taking into account the sampling on the average speeds in the database and the fact that the new speed setpoint v$_{ref,n}$ must be closest to the speed setpoint v$_{ref}$ of the operator 14, which remains unchanged. Indeed, the operator 14 imposes the speed setpoint v$_{ref}$ and the correction acts around it.

During this optimization sub-step 203.3 of the speed setpoint v$_{ref,n}$, a variation phase 203.4 of the new speed setpoint v$_{ref,n}$ is carried out. The variation phase 203.4 consists in changing the new speed setpoint v$_{ref,n}$ very slightly. The speed setpoint is changed from v$_{ref,n}$ to v$_{ref,n,var}$. A reading phase 203.5 of the torque variations AC by the learning and correction device 4 using all the sensors is performed before and after the variation phase 203.4. Thus, the learning and correction device 4 has the value of the torque variation AC$_{ref,n}$ corresponding to the new speed setpoint v$_{ref,n}$ and the value of the torque variation AC$_{ref,n,var}$ for the variation of the new speed setpoint v$_{ref,n,var}$.

The variation phase 203.4 and the reading phase 203.5 are followed by a comparison phase 203.6 between the values of the torque variations obtained in the reading phase 203.4, that is to say between AC$_{ref,n}$ and AC$_{ref,n,var}$.

The difference between the two values AC$_{ref,n}$ and AC$_{ref,n,var}$ obtained during the comparison phase 203.6 is then sent to a corrector internal to the learning and correction device 4 in order to confirm that the oscillation has actually been reduced; this is the confirmation phase 203.7. If it is confirmed that the oscillation has been decreased, then steps 203.4 to 203.7 are repeated until a difference is obtained which confirms that there has been no decrease in the oscillation.

If it is confirmed that the oscillation has not decreased, then an optimized speed v$_{optim}$ for a local minimum of oscillations has been found.

In addition, the constraint of remaining close to the speed setpoint v$_{ref}$ requires stopping the optimization sub-step 203.3 if there is too much deviation from the setpoint $v_{ref}$ during phases 203.4 to 203.7.

When the learning and correction device 4 has obtained the speed setpoint $v_{optim}$, which is therefore an optimization of the speed setpoint $v_{ref,n}$, the learning and correction device 4 carries out an adjustment sub-step 203.8 by sending the value of $v_{optim}$ to the control device 5 in the form of an instruction 15 to vary the drive of the motor and thus to adjust the average speed of the cable to $v_{optim}$ from the value of the enhanced parameter. In FIG. 4, we see that $v_{optim}$ is, in terms of minima of torque variations AC, is an optimization of $v_{ref,n}$.

The step of reducing the value of the torque variation AC 203 may optionally comprise a second verification sub-step 203.9 of the possibility of reaching $v_{optim}$, optimization of the speed setpoint $v_{ref,n}$, close to the speed setpoint $v_{ref}$. It is thus always ensured that there is either an acceptable oscillation or an absence of oscillation. In the case where $v_{optim}$ is too restrictive, for example, because there is too much deviation from the speed setpoint $v_{ref}$, the learning and correction device 4 then acts by adjusting an alternative or complementary parameter of the speed such as via the cable tension T for example. This parameter change corrected by the learning and correction device 4 takes place until the correction can be resumed on the average speed v and therefore on the speed setpoint, for example following a modification of the mass m on the line. The learning and correction device 4 then operates again as detailed previously, and reapplies a nominal tension to the cable 20 identical to that before modification.

If the value of the torque variation $AC_{real}$ is less than the threshold value VS, then the oscillation is an acceptable oscillation. However, even if the oscillation is acceptable, it may be useful to try to decrease the oscillation, for example for passenger comfort. Moreover, the real minimum of the oscillations has not necessarily been reached.

To reduce the amplitude of the acceptable oscillation, the learning and correction device 4 proceeds directly to the optimization sub-step 203.3. In this case, the principle of the optimization sub-step 203.3 described above is applied to the speed setpoint $v_{ref}$ given by the operator 14.

The goal is to modify the speed setpoint $v_{ref}$ very slightly in order to obtain an optimized speed setpoint $v_{optim}$ in terms of minimum torque variations AC, knowing that one is already outside areas of instability.

During this optimization sub-step 203.3 of the speed setpoint $v_{ref}$, a phase 203.4 for varying the speed setpoint $v_{ref}$ is carried out. The variation phase 203.4 consists in changing the speed setpoint $v_{ref}$ very slightly. The speed setpoint is changed from $v_{ref}$ to $v_{ref,var}$. A reading phase 203.5 of the torque variations AC by the learning and correction device 4 using all the sensors is performed before and after the variation phase 203.4. Thus, the learning and correction device 4 has the value of the torque variation $AC_{ref}$ corresponding to the speed setpoint $v_{ref}$ and the value of the torque variation $AC_{ref,var}$ for the variation of the speed setpoint $v_{ref,var}$.

The variation phase 203.4 and the reading phase 203.5 are followed by a comparison phase 203.6 between the values of the torque variations obtained in the reading phase 203.4, that is to say, between $AC_{ref}$ and $AC_{ref,var}$.

The difference between the two values $AC_{ref}$ and $AC_{ref,var}$ obtained during the comparison phase 203.6 is then sent to the internal corrector of the learning and correction device 4 to confirm that the oscillation has indeed been reduced; this is the confirmation phase 203.7. If it is confirmed that the oscillation has been reduced, then steps 203.4 to 203.7 are repeated until a difference is obtained which confirms that there is no further reduction in the oscillation.

If it is confirmed that the oscillation has not decreased or is no longer decreasing, then an optimized speed $v_{optim}$ for a local minimum of oscillations has been found.

In addition, the constraint of remaining close to the speed setpoint $v_{ref}$ requires stopping the optimization sub-step 203.3 if there is too much deviation from the setpoint $v_{ref}$ during phases 203.4 to 203.7.

Then the learning and correction device 4 continues with the adjustment sub-step 203.8 and possibly the second verification sub-step 203.9 described above.

The measurements of the average values of the parameters m, T, v, d and of the torque variations AC during the step of generating the database 202 are carried out over a duration DT. The correction phase 203 is carried out over a period of action DA. The durations DT and DA are chosen according to the frequency at which it is desired for the learning and correction device 4 to come into action.

The described method can also comprise a step of recording the optimized speeds $v_{optim}$. Returning to the previous example, once $v_{optim}$ has been reached, the learning and correction device 4 records the values of the parameters of the transport installation 100 and associates them with the optimum speed $v_{optim}$ calculated for the speed setpoint $v_{ref}$ given by the operator 14. The recording takes place in a data library. In this way, a set of speeds $v_{optim}$ is established from each optimization improvement, and associated with a triplet of parameters [m, T, d] and a given setpoint speed $v_{ref}$. In other words, the speed $v_{optim}$ is a function $f$ of the average speed $v_{ref}$ for a triplet [m T d]:

$$v_{optim} = f_{[m,T,d]}(v_{ref})$$

This results in curves D representing the functions $f$ for a triplet of parameters [m T d]. Under these conditions, it suffices for the learning and correction device 4 to read the setpoint speed $v_{ref}$ given by the operator 14 as well as the instantaneous triplet [m T d] owing to all the sensors placed on the transport installation 100, then to go and search the data library for the improvement to the corresponding speed optimization $v_{optim}$.

An interpolation method, like the one carried out during the interpolation sub-step, can be carried out if the curve D is not found in the database.

Figure 5:
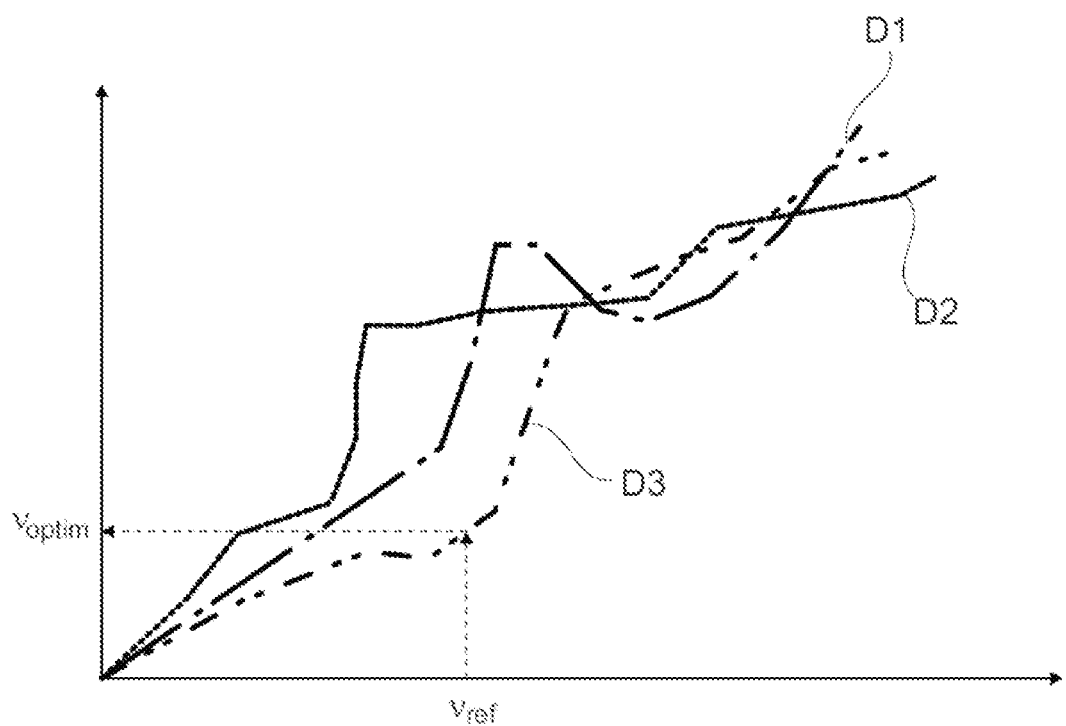
FIG. 5 is a graph showing the optimized speed setpoint as a function of the speed setpoint given by the operator.

With reference to FIG. 5, a graph shows a curve D1 illustrating the function $f_{[m_1,T_1,d_1]}$ and the curve D2 illustrating the function $f_{[m_2,T_2,d_2]}$. If the optimum speed is not known, the learning and correction device 4 can perform an interpolation similar to that described for the second data extrapolation sub-step. An interpolation is carried out from the function whose triplet is closest to the real triplet, therefore either from the function $f_{[m_1,T_1,d_1]}$ or from the function $f_{[m_2,T_2,d_2]}$, which are already known. It is thus possible to access $f_{[m_3,T_3,d_3],interpol}$, giving the $v_{optim}$ for any triplet [$m_3$, $T_3$, $d_3$] and illustrated by curve D3. Then the control device can directly use $v_{optim}$ corresponding to the speed setpoint $v_{ref}$ for the [$m_3$, $T_3$, $d_3$].

This data library can then be used independently by the control device 5, without it being necessary to carry out a succession of learning and correction phases, once a sufficient number of learning and optimization cycles have been carried out.

The description of the control method is developed for a transport system using a continuously moving cable with several vehicles evenly distributed along a single mobile cable loop to which they are attached. The principle detailed in this description nevertheless remains valid for reciprocating and continuous movement devices, provided with one or more vehicles on each track, with one or more mobile and/or fixed cables.

The disclosed method 200 is more widely applicable to any process for optimizing a characteristic quantity of a cable transport installation 100 as a function of a setpoint quantity. The optimization is further carried out by the device 4, which in turn is integrated into the transport installation 100, and using measurement points distributed over the transport installation 100. The measurements are carried out in real time or else collected and saved for later use. A characteristic quantity is a quantity which relates to the operation of the transport installation 100, to its movement and to its characteristics. For example, a characteristic quantity can be an amplitude of the oscillations of at least one cable and/or of at least one of the vehicles carried by the cable as described above, an electric consumption of the drive motors, any parameter of adjustment of the automatisms which generate the setpoints, any mechanical quantity which defines the movement of the device or even any quantity which characterizes the state of the system at a given instant.

The mathematical tools of the method according to the invention are only an illustration. The method according to the invention could use a stochastic probabilistic approach or machine learning algorithms instead of the described mathematical tools to achieve the optimization of the characteristic quantity as a function of the setpoint.

Of course, the invention is not limited to the examples which have just been described, and numerous modifications can be made to these examples without departing from the scope of the invention.

The invention claimed is:

1. A method of controlling an installation for transporting vehicles moved by at least one continuously moving cable, the method comprising
    a step of determining at least one oscillation of the cable and/or of at least one of the vehicles as a function of at least one parameter chosen from the following parameters: an average tension of the cable, an average speed of the cable, a distance between two successive vehicles, and an average mass transported by the vehicles,
    a step of generating a database which connects values of the oscillation to a combination of the average tension of the cable, the average speed of the cable, the distance between two successive vehicles, and the average mass carried by the vehicles, and
    a step of reducing the oscillation by varying one or more parameters to be varied chosen from the parameters, using the database.

2. The method of claim 1, wherein the step of generating the database comprises a first sub-step of sampling oscillations, each of the sampled oscillations being associated with a measurement of the average tension of the cable, of the average speed of the cable, of the distance between two successive vehicles, and of the average mass carried by the vehicles.

3. The method of claim 2, wherein the step of generating the database comprises a second sub-step of extrapolating the data obtained during the first sub-step to complete the database.

4. The method of claim 2, wherein the first sub-step is carried out when the installation operates in steady state.

5. The method of claim 1, comprising a comparison step of comparing the oscillation value and a threshold value above which an oscillation is prohibited and below which an oscillation is authorized.

6. The method of claim 1, wherein the step of reducing the oscillation comprises an optimization sub-step of optimizing the parameter to be varied so that the value of the oscillation reaches a minimal value, the minimal value being a local minimum of oscillations that has been found during the optimization sub-step.

7. The method of claim 1, comprising a comparison step of comparing the oscillation value and a threshold value above which an oscillation is prohibited and below which an oscillation is authorized.

8. The method of claim 7, wherein the step of reducing the oscillation comprises an optimization sub-step of optimizing the parameter to be varied so that the value of the oscillation reaches a minimal value, the minimal value being a local minimum of oscillations that has been found during the optimization sub-step, being carried out directly after the comparison step when the oscillation value is less than the threshold value.

9. The method of claim 6, wherein the step of reducing the oscillation comprises an improvement sub-step of improving the parameter to be varied by choosing a value of the parameter to be varied from the database when the oscillation value is greater than a threshold value in order to bring the oscillation value to a value less than the threshold value, the improvement sub-step being performed before the optimization sub-step.

10. The method of claim 6, wherein the step of reducing the oscillation comprises a sub-step of adjusting the parameter to be varied in order to bring the value of the parameter to be varied to an optimized value.

11. The method of claim 6, wherein the step of reducing the oscillation comprises a sub-step of checking the possibility of reaching the optimized value of the parameter to be varied, when the possibility of reaching the optimized value is in the negative, another parameter from the parameters is adjusted.

12. The method of claim 6, comprising a step of recording an optimized value of the parameter to be varied as a function of a setpoint value of the parameter to be varied in order to generate a data library.

13. The method of claim 1, wherein the parameter to be varied are the average speed of the cable and/or the average tension of the cable.

14. The method of claim 1, wherein the value of the oscillation is an amplitude of the oscillation.

15. The method of claim 14, wherein the value of the amplitude is determined based on a measurement of torque variations of an instantaneous torque delivered by a motor driving a driving pulley driving the continuously moving cable.

16. The method of claim 15, wherein the measurement of the torque variations is supplemented by measurements done by sensors placed directly along the continuously moving cable.

17. The method of claim 1, wherein the oscillation is an established periodic oscillatory movement.

18. The method of claim 7, wherein the step of reducing the oscillation comprises an optimization sub-step of optimizing the parameter to be varied so that the value of the oscillation reaches a minimal value, the minimal value being a local minimum of oscillations that has been found during the optimization sub-step.

19. A learning and correction device for an installation for transporting vehicles by a continuously moving cable comprising at least one computing system configured to implement a method of controlling an installation for transporting vehicles moved by at least one continuously moving cable, the method comprising:
- a step of determining at least one oscillation of the cable and/or of at least one of the vehicles as a function of at least one parameter chosen from the following parameters: an average tension of the cable, an average speed of the cable, a distance between two successive vehicles, and an average mass transported by the vehicles,
- a step of generating a database which connects values of the oscillation to a combination of the average tension of the cable, the average speed of the cable, the distance between two successive vehicles, and the average mass carried by the vehicles, and
- a step of reducing the oscillation by varying one or more parameters to be varied chosen from the parameters, using the database.

20. An installation for transporting vehicles by a continuously moving cable comprising at least one learning and correction device for an installation for transporting vehicles by a continuously moving cable comprising at least one computing system configured to implement a method of controlling an installation for transporting vehicles moved by at least one continuously moving cable, the method comprising:
- a step of determining at least one oscillation of the cable and/or of at least one of the vehicles as a function of at least one parameter chosen from the following parameters: an average tension of the cable, an average speed of the cable, a distance between two successive vehicles, and an average mass transported by the vehicles,
- a step of generating a database which connects values of the oscillation to a combination of the average tension of the cable, the average speed of the cable, the distance between two successive vehicles, and the average mass carried by the vehicles, and
- a step of reducing the oscillation by varying one or more parameters to be varied chosen from the parameters, using the database.

21. A non-transitory computer readable medium storing instructions comprising portions of program codes for the execution of the steps of the method of controlling an installation for transporting vehicles moved by at least one continuously moving cable, when said non-transitory medium is executed on a computer, the method comprising:
- a step of determining at least one oscillation of the cable and/or of at least one of the vehicles as a function of at least one parameter chosen from the following parameters: an average tension of the cable, an average speed of the cable, a distance between two successive vehicles, and an average mass transported by the vehicles,
- a step of generating a database which connects values of the oscillation to a combination of the average tension of the cable, the average speed of the cable, the distance between two successive vehicles, and the average mass carried by the vehicles, and
- a step of reducing the oscillation by varying one or more parameters to be varied chosen from the parameters, using the database.

* * * * *